United States Patent
Dai et al.

(10) Patent No.: US 8,488,564 B2
(45) Date of Patent: Jul. 16, 2013

(54) METHOD AND DEVICE FOR MAPPING A CODEWORD TO A LAYER IN A MULTI-INPUT MULTI-OUTPUT SYSTEM

(75) Inventors: Bo Dai, Shenzhen (CN); Guanghui Yu, Shenzhen (CN); Hui Yu, Shenzhen (CN); Yijian Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 268 days.

(21) Appl. No.: 13/144,099

(22) PCT Filed: Dec. 16, 2009

(86) PCT No.: PCT/CN2009/075622
§ 371 (c)(1),
(2), (4) Date: Jul. 12, 2011

(87) PCT Pub. No.: WO2010/083709
PCT Pub. Date: Jul. 29, 2010

(65) Prior Publication Data
US 2011/0268093 A1    Nov. 3, 2011

(30) Foreign Application Priority Data

Jan. 21, 2009  (CN) .......................... 2009 1 0076801

(51) Int. Cl.
*H04B 7/216*  (2006.01)
(52) U.S. Cl.
USPC ........................................................ 370/335
(58) Field of Classification Search
None
See application file for complete search history.

(56) References Cited

U.S. PATENT DOCUMENTS
2008/0063115 A1    3/2008    Varadarajan et al.

FOREIGN PATENT DOCUMENTS

| | | | |
|---|---|---|---|
| CN | 101163121 A | 4/2008 |
| CN | 101291198 A | 10/2008 |
| CN | 101465718 A | 6/2009 |
| WO | 2008031037 A2 | 3/2008 |
| WO | 2008058112 A2 | 5/2008 |

OTHER PUBLICATIONS

International Search Report on international application No. PCT/CN2009/075622, mailed on Mar. 25, 2010.
English Translation of the Written Opinion of the International Search Authority in international application No. PCT/CN2009/075622, mailed on Mar. 25, 2010.
Technical Specification Group Radio Access Network Sep. 2008.

*Primary Examiner* — John Blanton
(74) *Attorney, Agent, or Firm* — Oppedahl Patent Law Firm LLC

(57) ABSTRACT

The present invention discloses a method for mapping a codeword to a layer in a multi-input multi-output system, the method includes: grouping current layers in a multi-input multi-output system according to the number of current codewords, and mapping each codeword to the layer of a group to which the codeword corresponds. The present invention further discloses a device for mapping a codeword to a layer in a multi-input multi-output system, the device includes: a layer grouping unit and a mapping unit, wherein the layer grouping unit is used for grouping current layers in a multi-input multi-output system according to the number of current codewords; and the mapping unit is used for mapping each codeword to the layer of a group to which the codeword corresponds. The present invention is easy to be implemented, and the mapping manner for mapping a codeword to a layer is more reasonable.

11 Claims, 1 Drawing Sheet

METHOD AND DEVICE FOR MAPPING A CODEWORD TO A LAYER IN A MULTI-INPUT MULTI-OUTPUT SYSTEM

TECHNICAL FIELD

The present invention relates to a method and device for mapping a codeword to a layer in a Multi-Input Multi-Output (MIMO) system.

BACKGROUND

In a Long Term Evolution (LTE) system, a downlink can support 2 codeword spatial multiplexing and 4 antenna ports at most, correspondingly, the number of layers may be 1, 2, 3 and 4; The modulation symbols for each of the codewords are mapped onto one or several layers in the following manner:

assuming modulation symbols for a codeword q are $d^{(q)}(0), \ldots, d^{(q)}(M_{symb}^{(q)}-1)$, wherein $M_{symb}^{(q)}$ represents the number of symbols obtained by modulating the codeword q; assuming the modulation symbols for the codeword mapped to a layer v are $x^{(v)}(0), \ldots, x^{(v)}(M_{symb}^{layer}-1)$, wherein $M_{symb}^{layer}$ represents the number of modulation symbols per layer. In this text, the same character represents the same meaning.

For transmission over a single antenna port, a single layer is used, and the mapping manner is as follows:

$x^{(0)}(i) = d^{(0)}(i)$, wherein $M_{symb}^{layer} = M_{symb}^{(0)}$.

For layer mapping of spatial multiplexing, the mapping manner is shown as in Table 1:

TABLE 1

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$ $x^{(1)}(i) = d^{(0)}(2i+1)$ | $M_{symb}^{layer} = M_{symb}^{(0)}/2$ |
| 3 | 2 | $x^{(0)}(i) = d^{(0)}(i)$ $x^{(1)}(i) = d^{(1)}(2i)$ $x^{(2)}(i) = d^{(1)}(2i+1)$ | $M_{symb}^{layer} = M_{symb}^{(0)} = M_{symb}^{(1)}/2$ |
| 4 | 2 | $x^{(0)}(i) = d^{(0)}(2i)$ $x^{(1)}(i) = d^{(0)}(2i+1)$ | $M_{symb}^{layer} = M_{symb}^{(0)}/2 = M_{symb}^{(1)}/2$ |

TABLE 1-continued

| Number of layers | Number of codewords | Codeword-to-layer mapping $i = 0, 1, \ldots, M_{symb}^{layer} - 1$ |
|---|---|---|
| | | $x^{(2)}(i) = d^{(1)}(2i)$ $x^{(3)}(i) = d^{(1)}(2i+1)$ |

In the Table 1 above, the number of layers is smaller than or equal to the number of the antenna ports for transmitting physical channels; a single codeword is mapped to two layers only when the number of antenna ports is 4.

The transmission diversity mapping of a single codeword-to-layer is shown as in Table 2:

TABLE 2

| Number of layers | Number of codewords | Codeword-to-layer mapping $i = 0, 1, \ldots, M_{symb}^{layer} - 1$ | |
|---|---|---|---|
| 2 | 1 | $x^{(0)}(i) = d^{(0)}(2i)$ $x^{(1)}(i) = d^{(0)}(2i+1)$ | $M_{symb}^{layer} = M_{symb}^{(0)}/2$ |
| 4 | 1 | $x^{(0)}(i) = d^{(0)}(4i)$ $x^{(1)}(i) = d^{(0)}(4i+1)$ $x^{(2)}(i) = d^{(0)}(4i+2)$ $x^{(3)}(i) = d^{(0)}(4i+3)$ | $M_{symb}^{layer} = \begin{cases} M_{symb}^{(0)}/4 & \text{if } M_{symb}^{(0)} \bmod 4 = 0 \\ (M_{symb}^{(0)}+2)/4 & \text{if } M_{symb}^{(0)} \bmod 4 \neq 0 \end{cases}$ if $M_{symb}^{(0)} \bmod 4 \neq 0$, two null symbols correspond to $d^{(0)}(M_{symb}^{(0)}-2)$ and $d^{(0)}(M_{symb}^{(0)}-1)$ |

It is defined, in the demand research report TR 36.814v0.1.1 of LTE-Advanced proposed in September 2008, that LTE-Advanced downlink spatial multiplexing can support transmission of 8 layers at most, therefore, it is still needed to design a solution of mapping to the layers which are more than 4, however, at present there is still not relevant solutions yet.

SUMMARY

In view of the above problem, the present invention aims to provide a method and device for mapping a codeword to a layer in a multi-input multi-output system, which can apply to the multi-input multi-output system where eight layers are supported.

In order to achieve the purpose above, the technical solution of the present invention is realized as follows:

A method for mapping a codeword to a layer in a multi-input multi-output system comprises:

grouping current layers in a multi-input multi-output system according to a number of current codewords, and mapping each codeword to a layer in a group to which the codeword corresponds.

Further, the number of the current layers in the multi-input multi-output system may be 4 or more than 4.

Further, the number of layers supported by the multi-input multi-output system may be 8 at most.

Further, under the condition that the number of the current codewords is 2, when the number of the current layers in the multi-input multi-output system is 6, after the grouping, the numbers of layers in each group may be 3, 3 respectively; when the number of the current layers in the multi-input multi-output system is 8, after the grouping, the numbers of layers in each group may be 4, 4 respectively; when the number of the current layers in the multi-input multi-output system is 5, after the grouping, the numbers of layers in each group may be 2, 3 respectively; and when the number of the current layers in the multi-input multi-output system is 7, after the grouping, the numbers of layers in each group may be 3, 4 respectively.

Further, under the condition that the number of the current codewords is 4, when the number of the current layers in the multi-input multi-output system is 4, after the grouping, the numbers of layers in each group may be 1, 1, 1, 1 respectively; when the number of the current layers in the multi-input multi-output system is 5, after grouping, the numbers of layers in each group may be 1, 1, 1, 2 respectively; when the number of the current layers in the multi-input multi-output system is 6, after the grouping, the numbers of layers in each group may be 1, 1, 2, 2 respectively; when the number of the current layers in the multi-input multi-output system is 7, after the grouping, the numbers of layers in each group may be 1, 2, 2, 2 respectively; and when the number of the current layers in the multi-input multi-output system is 8, after the grouping, the numbers of layers in each group may be 2, 2, 2, 2 respectively.

The method may further comprise:

modulating bits of each codeword into codeword symbols according to a preset encoding mode, and mapping the modulation symbols for a codeword to a layer in the group; and when each codeword is mapped to two layers or to more than two layers, the codeword symbols in each codeword may be mapped to each layer in the group in a polling manner.

Further, the codeword symbols may be mapped to a layer in the group, specifically:

a mapping relationship of transmission diversity may be as follows:

when the number of layers is 5: $x^{(0)}(i) = d^{(0)}(5i)$, $x^{(1)}(i) = d^{(0)}(5i+1)$, $x^{(2)}(i) = d^{(0)}(5i+2)$, $x^{(3)}(i) = d^{(0)}(5i+3)$, $x^{(4)}(i) = d^{(0)}(5i+4)$;

when the number of layers is 6: $x^{(0)}(i) = d^{(0)}(6i)$, $x^{(1)}(i) = d^{(0)}(6i+1)$, $x^{(2)}(i) = d^{(0)}(6i+2)$, $x^{(3)}(i) = d^{(0)}(6i+3)$, $x^{(4)}(i) = d^{(0)}(6i+4)$, $x^{(5)}(i) = d^{(0)}(6i+5)$;

when the number of layers is 7: $x^{(0)}(i) = d^{(0)}(7i)$, $x^{(1)}(i) = d^{(0)}(7i+1)$, $x^{(2)}(i) = d^{(0)}(7i+2)$, $x^{(3)}(i) = d^{(0)}(7i+3)$, $x^{(4)}(i) = d^{(0)}(7i+4)$, $x^{(5)}(i) = d^{(0)}(7i+5)$, $x^{(6)}(i) = d^{(0)}(7i+6)$;

when the number of layers is 8: $x^{(0)}(i) = d^{(0)}(8i)$, $x^{(1)}(i) = d^{(0)}(8i+1)$, $x^{(2)}(i) = d^{(0)}(8i+2)$, $x^{(3)}(i) = d^{(0)}(8i+3)$, $x^{(4)}(i) = d^{(0)}(8i+4)$, $x^{(5)}(i) = d^{(0)}(8i+5)$, $x^{(6)}(i) = d^{(0)}(8i+6)$, $x^{(7)}(i) = d^{(0)}(8i+7)$;

wherein the modulation symbols for a codeword q may be $d^{(q)}(0), \ldots, d^{(q)}(M_{symb}^{(q)}-1)$, $M_{symb}^{(q)}$ may represent the number of the modulation symbols for the codeword q; the symbols mapped to a layer v may be $x^{(v)}(0), \ldots, x^{(v)}(M_{symb}^{layer}-1)$, $M_{symb}^{layer}$ may represent the number of the modulation symbols per layer.

Further, the codeword symbols may be mapped to a layer in the group, specifically:

a mapping relationship of transmission multiplexing may be as follows:

under the condition that the number of codewords is 2:

when the number of layers is 5:

$x^{(0)}(i) = d^{(0)}(2i)$
$x^{(1)}(i) = d^{(0)}(2i+1)$,
$x^{(2)}(i) = d^{(1)}(3i)$
$x^{(3)}(i) = d^{(1)}(3i+1)$;
$x^{(4)}(i) = d^{(1)}(3i+2)$ when the number of layers is 6:

$x^{(0)}(i) = d^{(0)}(3i)$     $x^{(3)}(i) = d^{(1)}(3i)$
$x^{(1)}(i) = d^{(0)}(3i+1)$,  $x^{(4)}(i) = d^{(1)}(3i+1)$;
$x^{(2)}(i) = d^{(0)}(3i+2)$   $x^{(5)}(i) = d^{(1)}(3i+2)$ when the number of layers is 7:

$x^{(0)}(i) = d^{(0)}(3i)$     $x^{(3)}(i) = d^{(1)}(4i)$
$x^{(1)}(i) = d^{(0)}(3i+1)$,  $x^{(4)}(i) = d^{(1)}(4i+1)$
$x^{(2)}(i) = d^{(0)}(3i+2)$   $x^{(5)}(i) = d^{(1)}(4i+2)$;
                               $x^{(6)}(i) = d^{(1)}(4i+3)$ when the number of layers is 8:

$x^{(0)}(i) = d^{(0)}(4i)$     $x^{(4)}(i) = d^{(1)}(4i)$
$x^{(1)}(i) = d^{(0)}(4i+1)$   $x^{(5)}(i) = d^{(1)}(4i+1)$
$x^{(2)}(i) = d^{(0)}(4i+2)$,  $x^{(6)}(i) = d^{(1)}(4i+2)$;
$x^{(3)}(i) = d^{(0)}(4i+3)$   $x^{(7)}(i) = d^{(1)}(4i+3)$ wherein the modulation symbols for a codeword q may be $d^{(q)}(0), \ldots, d^{(q)}(M_{symb}^{(q)}-1)$, $M_{symb}^{(q)}$ may represent the number of the modulation symbols for the codeword q; the symbols mapped to a layer v may be $x^{(v)}(0), \ldots, x^{(v)}(M_{symb}^{layer}-1)$, $M_{symb}^{layer}$ may represent the number of the modulation symbols per layer.

Further, the codeword symbols may be mapped to a layer in the group, specifically:

a mapping relationship of transmission multiplexing may be as follows:

under the condition that the number of codewords is 4:

when the number of layers is 4:

$x^{(0)}(i) = d^{(0)}(i)$, $x^{(1)}(i) = d^{(1)}(i)$, $x^{(2)}(i) = d^{(2)}(i)$, $x^{(3)}(i) = d^{(3)}(i)$;

when the number of layers is 5:

$x^{(0)}(i) = d^{(0)}(i)$, $x^{(1)}(i) = d^{(1)}(i)$, $x^{(2)}(i) = d^{(2)}(i)$, $x^{(3)}(i) = d^{(3)}(2i)$;
$x^{(4)}(i) = d^{(3)}(2i+1)$ when the number of layers is 6:

$x^{(0)}(i) = d^{(0)}(i)$, $x^{(1)}(i) = d^{(1)}(i)$, $x^{(3)}(i) = d^{(3)}(2i)$     $x^{(2)}(i) = d^{(2)}(2i)$     $x^{(4)}(i) = d^{(3)}(2i)$
$x^{(4)}(i) = d^{(3)}(2i+1)$   $x^{(3)}(i) = d^{(2)}(2i+1)$,  $x^{(5)}(i) = d^{(3)}(2i+1)$;

when the number of layers is 7:

$x^{(0)}(i) = d^{(0)}(i)$,  $x^{(1)}(i) = d^{(1)}(2i)$
                            $x^{(2)}(i) = d^{(1)}(2i+1)$, $x^{(3)}(i) = d^{(2)}(2i)$     $x^{(5)}(i) = d^{(3)}(2i)$
$x^{(4)}(i) = d^{(2)}(2i+1)$,  $x^{(6)}(i) = d^{(3)}(2i+1)$;

-continued when the number of layers is 8:

$$\begin{aligned}&x^{(0)}(i) = d^{(0)}(2i) \\ &x^{(1)}(i) = d^{(0)}(2i+1)\end{aligned}, \begin{aligned}&x^{(2)}(i) = d^{(1)}(2i) \\ &x^{(3)}(i) = d^{(1)}(2i+1)\end{aligned},$$

$$\begin{aligned}&x^{(4)}(i) = d^{(2)}(2i) \\ &x^{(5)}(i) = d^{(2)}(2i+1)\end{aligned}, \begin{aligned}&x^{(6)}(i) = d^{(3)}(2i) \\ &x^{(7)}(i) = d^{(3)}(2i+1)\end{aligned};$$

wherein the modulation symbols for a codeword q may be $d^{(q)}(0), \ldots, d^{(q)}(M_{symb}^{(q)}-1)$, $M_{symb}^{(q)}$ may represent the number of the modulation symbols for the codeword q; the symbols mapped to a layer v may be $x^{(v)}(0), \ldots, x^{(v)}(M_{symb}^{layer}-1)$, $M_{symb}^{layer}$ may represent the number of the modulation symbols per layer.

Further, when the numbers of the codeword symbols mapped to each layer are different, a null codeword symbol or more may be added to the end of the codeword symbols, so that the numbers of codeword symbols mapped to each layer may be the same.

A device for mapping a codeword to a layer in a multi-input multi-output system comprises a layer grouping unit and a mapping unit; wherein the layer grouping unit is used for grouping current layers in a multi-input multi-output system according to the number of current codewords;

the mapping unit is used for mapping each codeword to a layer in a group to which the codeword corresponds.

Further, the number of the current layers in the multi-input multi-output system may be 4 or more than 4; the number of layers supported by the multi-input multi-output system may be 8 at most;

under the condition that the number of the current codewords is 2, when the number of the current layers in the multi-input multi-output system is 6, after the layer grouping unit completes the grouping, the numbers of layers in each group may be 3, 3 respectively; when the number of the current layers in the multi-input multi-output system is 8, after the layer grouping unit completes the grouping, the numbers of layers in each group may be 4, 4 respectively; when the number of the current layers in the multi-input multi-output system is 5, after the layer grouping unit completes the grouping, the numbers of layers in each group may be 2, 3 respectively; and when the number of the current layers in the multi-input multi-output system is 7, after the layer grouping unit completes the grouping, the numbers of layers in each group may be 3, 4 respectively;

under the condition that the number of the current codewords is 4, when the number of the current layers in the multi-input multi-output system is 4, after the layer grouping unit completes the grouping, the numbers of layers in each group may be 1, 1, 1, 1 respectively; when the number of the current layers in the multi-input multi-output system is 5, after the layer grouping unit completes the grouping, the numbers of layers in each group may be 1, 1, 1, 2 respectively; when the number of the current layers in the multi-input multi-output system is 6, after the layer grouping unit completes the grouping, the numbers of layers in each group may be 1, 1, 2, 2 respectively; when the number of the current layers in the multi-input multi-output system is 7, after the layer grouping unit completes the grouping, the numbers of layers in each group may be 1, 2, 2, 2 respectively; and when the number of the current layers in the multi-input multi-output system is 8, after the layer grouping unit completes the grouping, the numbers of layers in each group may be 2, 2, 2, 2 respectively.

Further, the device may also comprise a modulating unit for modulating bits of each codeword into codeword symbols according to a preset encoding mode;

the mapping unit may be further used for mapping modulation symbols for a single codeword to the layer in the group to which the codeword corresponds; and when modulation symbols for the single codeword is mapped to two layers or to more than two layers, the mapping unit may be further used for mapping the codeword symbols in the single codeword to each layer in a polling manner;

the mapping unit may be further used for mapping the codeword symbols to a layer in the group to which the codeword symbols correspond, specifically:

a mapping relationship of transmission diversity may be as follows:

when the number of layers is 5: $x^{(0)}(i) = d^{(0)}(5i), x^{(1)}(i) = d^{(0)}(5i+1)$, $$x^{(2)}(i) = d^{(0)}(5i+2), x^{(3)}(i) = d^{(0)}(5i+3), x^{(4)}(i) = d^{(0)}(5i+4);$$

when the number of layers is 6: $x^{(0)}(i) = d^{(0)}(6i)$, $$x^{(1)}(i) = d^{(0)}(6i+1), x^{(2)}(i) = d^{(0)}(6i+2), x^{(3)}(i) = d^{(0)}(6i+3),$$

$$x^{(4)}(i) = d^{(0)}(6i+4), x^{(5)}(i) = d^{(0)}(6i+5);$$

when the number of layers is 7: $x^{(0)}(i) = d^{(0)}(7i)$, $$x^{(1)}(i) = d^{(0)}(7i+1), x^{(2)}(i) = d^{(0)}(7i+2), x^{(3)}(i) = d^{(0)}(7i+3),$$

$$x^{(4)}(i) = d^{(0)}(7i+4), x^{(5)}(i) = d^{(0)}(7i+5), x^{(6)}(i) = d^{(0)}(7i+6);$$

when the number of layers is 8: $x^{(0)}(i) = d^{(0)}(8i), x^{(1)}(i) = d^{(0)}(8i+1)$, $$x^{(2)}(i) = d^{(0)}(8i+2), x^{(3)}(i) = d^{(0)}(8i+3), x^{(4)}(i) = d^{(0)}(8i+4),$$

$$x^{(5)}(i) = d^{(0)}(8i+5), x^{(6)}(i) = d^{(0)}(8i+6), x^{(7)}(i) = d^{(0)}(8i+7);$$

a mapping relationship of transmission multiplexing may be as follows:

under the condition that the number of codewords is 2:

when the number of layers is 5: $\begin{aligned}&x^{(0)}(i) = d^{(0)}(2i) \\ &x^{(1)}(i) = d^{(0)}(2i+1)\end{aligned}$, $$\begin{aligned}&x^{(2)}(i) = d^{(1)}(3i) \\ &x^{(3)}(i) = d^{(1)}(3i+1) \\ &x^{(4)}(i) = d^{(1)}(3i+2)\end{aligned};$$

when the number of layers is 6: $\begin{aligned}&x^{(0)}(i) = d^{(0)}(3i) \\ &x^{(1)}(i) = d^{(0)}(3i+1), \\ &x^{(2)}(i) = d^{(0)}(3i+2)\end{aligned}$ $$\begin{aligned}&x^{(3)}(i) = d^{(1)}(3i) \\ &x^{(4)}(i) = d^{(1)}(3i+1) \\ &x^{(5)}(i) = d^{(1)}(3i+2)\end{aligned};$$

when the number of layers is 7: $\begin{aligned}&x^{(0)}(i) = d^{(0)}(3i) \\ &x^{(1)}(i) = d^{(0)}(3i+1), \\ &x^{(2)}(i) = d^{(0)}(3i+2)\end{aligned}$ -continued $$x^{(3)}(i) = d^{(1)}(4i)$$
$$x^{(4)}(i) = d^{(1)}(4i+1)$$
$$x^{(5)}(i) = d^{(1)}(4i+2)$$
$$x^{(6)}(i) = d^{(1)}(4i+3)$$

when the number of layers is 8:
$$\begin{aligned} x^{(0)}(i) &= d^{(0)}(4i) & x^{(4)}(i) &= d^{(1)}(4i) \\ x^{(1)}(i) &= d^{(0)}(4i+1) & x^{(5)}(i) &= d^{(1)}(4i+1) \\ x^{(2)}(i) &= d^{(0)}(4i+2) & x^{(6)}(i) &= d^{(1)}(4i+2) \\ x^{(3)}(i) &= d^{(0)}(4i+3) & x^{(7)}(i) &= d^{(1)}(4i+3) \end{aligned};$$

under the condition that the number of codewords is 4:

when the number of layers is 4:

$$x^{(0)}(i) = d^{(0)}(i), x^{(1)}(i) = d^{(1)}(i), x^{(2)}(i) = d^{(2)}(i), x^{(3)}(i) = d^{(3)}(i);$$

when the number of layers is 5:

$$x^{(0)}(i) = d^{(0)}(i), x^{(1)}(i) = d^{(1)}(i), x^{(2)}(i) = d^{(2)}(i), \begin{aligned} x^{(3)}(i) &= d^{(3)}(2i) \\ x^{(4)}(i) &= d^{(3)}(2i+1) \end{aligned};$$

when the number of layers is 6:

$$x^{(0)}(i) = d^{(0)}(i), x^{(1)}(i) = d^{(1)}(i),$$

$$\begin{aligned} x^{(3)}(i) &= d^{(3)}(2i) & x^{(2)}(i) &= d^{(2)}(2i) & x^{(4)}(i) &= d^{(3)}(2i) \\ x^{(4)}(i) &= d^{(3)}(2i+1) & x^{(3)}(i) &= d^{(2)}(2i+1) & x^{(5)}(i) &= d^{(3)}(2i+1) \end{aligned};$$

when the number of layers is 7:

$$x^{(0)}(i) = d^{(0)}(i), \begin{aligned} x^{(1)}(i) &= d^{(1)}(2i) \\ x^{(2)}(i) &= d^{(1)}(2i+1) \end{aligned},$$

$$\begin{aligned} x^{(3)}(i) &= d^{(2)}(2i) & x^{(5)}(i) &= d^{(3)}(2i) \\ x^{(4)}(i) &= d^{(2)}(2i+1) & x^{(6)}(i) &= d^{(3)}(2i+1) \end{aligned};$$

when the number of layers is 8:

$$\begin{aligned} x^{(0)}(i) &= d^{(0)}(2i) & x^{(2)}(i) &= d^{(1)}(2i) \\ x^{(1)}(i) &= d^{(0)}(2i+1), & x^{(3)}(i) &= d^{(1)}(2i+1) \end{aligned},$$

$$\begin{aligned} x^{(4)}(i) &= d^{(2)}(2i) & x^{(6)}(i) &= d^{(3)}(2i) \\ x^{(5)}(i) &= d^{(2)}(2i+1) & x^{(7)}(i) &= d^{(3)}(2i+1) \end{aligned};$$

wherein the modulation symbols for a codeword q may be $d^{(q)}(0), \ldots, d^{(q)}(M_{symb}^{(q)}-1)$, $M_{symb}^{(q)}$ may represent the number of the modulation symbols for the codeword q, the symbols mapped to a layer v may be $x^{(v)}(0), \ldots, x^{(v)}(M_{symb}^{layer}-1)$, $M_{symb}^{layer}$ may represent the number of the modulation symbols per layer.

Further, when the numbers of the codeword symbols mapped to each layer are different, a null codeword symbol or more may be added to the end of the codeword symbols, so that the numbers of codeword symbols mapped to each layer may be the same.

By setting a multiplexing mapping manner which supports eight layers at most, the present invention perfectly realizes the support for a multi-input multi-output service in the LTE-Advanced system. The present invention can be easily implemented, and the codeword-to-layer mapping manner is more reasonable.

DETAILED DESCRIPTION

The basic idea of the present invention is to realize the support for multi-input multi-output service in an LTE-Advanced system by setting a multiplexing mapping which supports eight layers at most. The present invention is simple to be implemented, and the codeword-to-layer mapping manner is more reasonable.

The following embodiments are given by reference to accompanying figures to further illustrate the present invention in detail to make the purpose, the technical solution and advantages of the present invention more clear.

Figure 1:
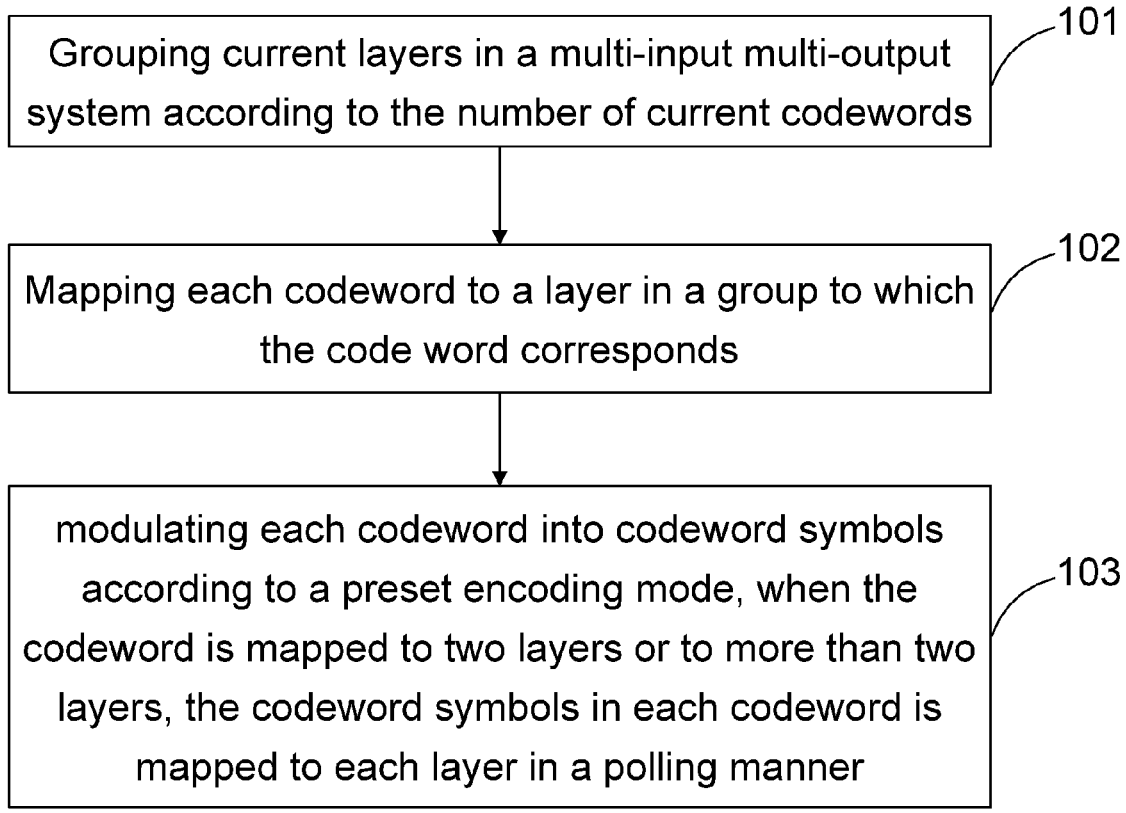
FIG. 1 is a flowchart illustrating a method for mapping a codeword to a layer in a multi-input multi-output system according to an embodiment of the present invention.

FIG. 1 is a flowchart illustrating a method for mapping a codeword to a layer in a multi-input multi-output system according to an embodiment of the present invention, as shown in FIG. 1, the method for mapping a codeword to a layer in a multi-input multi-output system in this embodiment comprises the following steps:

Step 101: grouping the current layers in a multi-input multi-output system according to the number of the current codewords.

As for an LTE-Advanced system, the number of the layers supported is 8 at most, and the number of codewords for a service may be 1, 2 or 4; when the number of codewords is 1, that is, all the current layers in the system are grouped into one group, namely, a diversity mapping is adopted here; in the case that the number of layers is 4 or less than 4, a mapping is performed by reference to the mapping manner shown in the Table 2; in the case that the number of layers is 5 or more than 5, a mapping is performed by reference to the mapping manner shown in the Table 3:

TABLE 3

| Number of layers | Number of codewords | Codeword-to-layer mapping $i = 0, 1, \ldots, M_{symb}^{layer} - 1$ |
|---|---|---|
| 5 | 1 | $x^{(0)}(i) = d^{(0)}(5i)$, $x^{(1)}(i) = d^{(0)}(5i+1)$, $x^{(2)}(i) = d^{(0)}(5i+2)$ $x^{(3)}(i) = d^{(0)}(5i+3)$, $x^{(4)}(i) = d^{(0)}(5i+4)$, |
| 6 | 1 | $x^{(0)}(i) = d^{(0)}(6i)$, $x^{(1)}(i) = d^{(0)}(6i+1)$, $x^{(2)}(i) = d^{(0)}(6i+2)$ $x^{(3)}(i) = d^{(0)}(6i+3)$, $x^{(4)}(i) = d^{(0)}(6i+4)$, $x^{(5)}(i) = d^{(0)}(6i+5)$ |
| 7 | 1 | $x^{(0)}(i) = d^{(0)}(7i)$, $x^{(1)}(i) = d^{(0)}(7i+1)$, $x^{(2)}(i) = d^{(0)}(7i+2)$, $x^{(3)}(i) = d^{(0)}(7i+3)$, $x^{(4)}(i) = d^{(0)}(7i+4)$, $x^{(5)}(i) = d^{(0)}(7i+5)$, $x^{(6)}(i) = d^{(0)}(7i+6)$ |
| 8 | 1 | $x^{(0)}(i) = d^{(0)}(8i)$, $x^{(1)}(i) = d^{(0)}(8i+1)$, $x^{(2)}(i) = d^{(0)}(8i+2)$, $x^{(3)}(i) = d^{(0)}(8i+3)$, $x^{(4)}(i) = d^{(0)}(8i+4)$, |

TABLE 3-continued

| Number of layers | Number of codewords | Codeword-to-layer mapping $i = 0, 1, \ldots, M_{symb}^{layer} - 1$ |
|---|---|---|
| | | $x^{(5)}(i) = d^{(0)}(8i + 5)$, |
| | | $x^{(6)}(i) = d^{(0)}(8i + 6)$, |
| | | $x^{(7)}(i) = d^{(0)}(8i + 7)$ |

When the number of codewords is 2, that is, all the current layers in the system are grouped into two groups, in the case that the number of layers is 4 or less than 4, a mapping is performed by reference to the mapping manner shown in Table 2; in the cases that the numbers of layers are 5, 6, 7 and 8, after the layers are grouped, the numbers of layers in each group are (2, 3), (3, 3), (3, 4), (4, 4) respectively, that is, the 5, 6, 7 or 8 layers are divided into two groups and distributed in a polling manner, the expression of the grouping is described by means of mathematical array symbols.

When the number of codewords is 4, that is, all the current layers in the system is grouped into four groups; as the number of codewords is 4 here, there should be 4 layers or more than 4 layers which are distributed currently; in the cases that the numbers of layers are 4, 5, 6, 7 and 8, after the layers are grouped, the numbers of layers in each group are (1, 1, 1, 1), (1, 1, 1, 2), (1, 1, 2, 2), (1, 2, 2, 2) and (2, 2, 2, 2) respectively, that is, the 4, 5, 6, 7 or 8 layers are divided into four groups and distributed in a polling manner.

Step 102: mapping each codeword to a layer in a group to which the codeword corresponds.

After the grouping is finished, each codeword automatically corresponds to a layer of a group, and each codeword corresponds to at least one layer.

Step 103: modulating bits of each codeword into codeword symbols according to a preset encoding mode, and mapping the codeword symbol in the codeword to each layer in a polling manner when the codeword is mapped to two layers or to more than two layers.

The purpose of mapping a codeword to a layer is to send these codewords, namely, sending the distributed codewords via the antennae of these layers, thus, it is needed to modulate bits of a codeword into codeword symbols according to a preset encoding mode and to map the codeword symbols to a layer according to a mapping relationship between the codeword and the layer; when a codeword is mapped in a diversity manner, one codeword corresponds to one layer which completes the transmission of the codeword; when one codeword is mapped to multiple layers in a multiplexing manner, it is needed to map the modulation symbols for the codeword to multiple layers respectively. Description is given in combination with the situation in step 101: when the number of codewords is 2 and the numbers of layers are 5, 6, 7 and 8, the multiplexing mapping manner refers to the Table 4:

TABLE 4

| Number of layers | Number of codewords | Codeword-to-layer mapping $i = 0, 1, \ldots, M_{symb}^{layer} - 1$ |
|---|---|---|
| 5 | 2 | $x^{(0)}(i) = d^{(0)}(2i)$ |
| | | $x^{(1)}(i) = d^{(0)}(2i + 1)$, |
| | | $x^{(2)}(i) = d^{(1)}(3i)$ |
| | | $x^{(3)}(i) = d^{(1)}(3i + 1)$ |
| | | $x^{(4)}(i) = d^{(1)}(3i + 2)$ |
| 6 | 2 | $x^{(0)}(i) = d^{(0)}(3i)$ |
| | | $x^{(1)}(i) = d^{(0)}(3i + 1)$ |
| | | $x^{(2)}(i) = d^{(0)}(3i + 2)$, |
| | | $x^{(3)}(i) = d^{(1)}(3i)$ |

TABLE 4-continued

| Number of layers | Number of codewords | Codeword-to-layer mapping $i = 0, 1, \ldots, M_{symb}^{layer} - 1$ |
|---|---|---|
| | | $x^{(4)}(i) = d^{(1)}(3i + 1)$ |
| | | $x^{(5)}(i) = d^{(1)}(3i + 2)$ |
| 7 | 2 | $x^{(0)}(i) = d^{(0)}(3i)$ |
| | | $x^{(1)}(i) = d^{(0)}(3i + 1)$ |
| | | $x^{(2)}(i) = d^{(0)}(3i + 2)$, |
| | | $x^{(3)}(i) = d^{(1)}(4i)$ |
| | | $x^{(4)}(i) = d^{(1)}(4i + 1)$ |
| | | $x^{(5)}(i) = d^{(1)}(4i + 2)$ |
| | | $x^{(6)}(i) = d^{(1)}(4i + 3)$ |
| 8 | 2 | $x^{(0)}(i) = d^{(0)}(4i)$ |
| | | $x^{(1)}(i) = d^{(0)}(4i + 1)$ |
| | | $x^{(2)}(i) = d^{(0)}(4i + 2)$ |
| | | $x^{(3)}(i) = d^{(0)}(4i + 3)$, |
| | | $x^{(4)}(i) = d^{(1)}(4i)$ |
| | | $x^{(5)}(i) = d^{(1)}(4i + 1)$ |
| | | $x^{(6)}(i) = d^{(1)}(4i + 2)$ |
| | | $x^{(7)}(i) = d^{(1)}(4i + 3)$ |

In the Table 4, it is illustrated in detail that a layer to which a codeword is mapped and the situation that the modulation symbols for the codeword is mapped to a layer in the group to which the codeword corresponds when the numbers of layers are 5, 6, 7 and 8. A brief description is given by taking the situation that the number of layers is 5 as an example: the codeword numbered with 0 is mapped to layers 0, 1; the codeword numbered with 1 is mapped to layers 2, 3 and 4; the codeword symbol of the codeword numbered with 0 is then distributed to layers 0, 1 in a polling manner and finally transmitted by the antennae corresponding to layers numbered with 0, 1. It should be noted that the number of the layer and the number of the codeword are set for simplifying the specification, there is no difference between the corresponding resources in the system.

When the number of codewords is 4 and the numbers of layers are 4, 5, 6, 7 and 8, the multiplexing mapping manner refers to the Table 5:

TABLE 5

| Number of layers | Number of codewords | Codeword-to-layer mapping $i = 0, 1, \ldots, M_{symb}^{layer} - 1$ |
|---|---|---|
| 4 | 4 | $x^{(0)}(i) = d^{(0)}(i)$, |
| | | $x^{(1)}(i) = d^{(1)}(i)$, |
| | | $x^{(2)}(i) = d^{(2)}(i)$, |
| | | $x^{(3)}(i) = d^{(3)}(i)$, |
| 5 | 4 | $x^{(0)}(i) = d^{(0)}(i)$, |
| | | $x^{(1)}(i) = d^{(1)}(i)$, |
| | | $x^{(2)}(i) = d^{(2)}(i)$, |
| | | $x^{(3)}(i) = d^{(3)}(2i)$ |
| | | $x^{(4)}(i) = d^{(3)}(2i + 1)$ |
| 6 | 4 | $x^{(0)}(i) = d^{(0)}(i)$, |
| | | $x^{(1)}(i) = d^{(1)}(i)$, |
| | | $x^{(2)}(i) = d^{(2)}(2i)$ |
| | | $x^{(3)}(i) = d^{(2)}(2i + 1)$, |
| | | $x^{(4)}(i) = d^{(3)}(2i)$ |
| | | $x^{(5)}(i) = d^{(3)}(2i + 1)$ |
| 7 | 4 | $x^{(0)}(i) = d^{(0)}(i)$, |
| | | $x^{(1)}(i) = d^{(1)}(2i)$ |
| | | $x^{(2)}(i) = d^{(1)}(2i + 1)$, |
| | | $x^{(3)}(i) = d^{(2)}(2i)$ |
| | | $x^{(4)}(i) = d^{(2)}(2i + 1)$, |
| | | $x^{(5)}(i) = d^{(3)}(2i)$ |
| | | $x^{(6)}(i) = d^{(3)}(2i + 1)$ |
| 8 | 4 | $x^{(0)}(i) = d^{(0)}(2i)$ |
| | | $x^{(1)}(i) = d^{(0)}(2i + 1)$, |
| | | $x^{(2)}(i) = d^{(1)}(2i)$ |
| | | $x^{(3)}(i) = d^{(1)}(2i + 1)$, |
| | | $x^{(4)}(i) = d^{(2)}(2i)$ |

TABLE 5-continued

| Number of layers | Number of codewords | Codeword-to-layer mapping $i = 0, 1, \ldots, M_{symb}^{layer} - 1$ |
|---|---|---|
| | 5 | $x^{(5)}(i) = d^{(2)}(2i+1)$, $x^{(6)}(i) = d^{(3)}(2i)$ $x^{(7)}(i) = d^{(3)}(2i+1)$ |

The substance disclosed in the Table 5 is the same with that disclosed in the Table 4, so the mapping relationship in the Table 5 is not repeated here.

Assuming the number of current layers is N, for the diversity mapping or multiplexing mapping, when the number of symbols on a single codeword satisfies that $M_{symb}^{(0)}$ mod N≠0, it is needed to add a null codeword symbol or more to the end of the codeword symbols on a layer to which less codeword symbols are mapped, so that the numbers of codeword symbols per layer are same, and each layer can consequently transmit codeword symbols synchronously.

Figure 2:
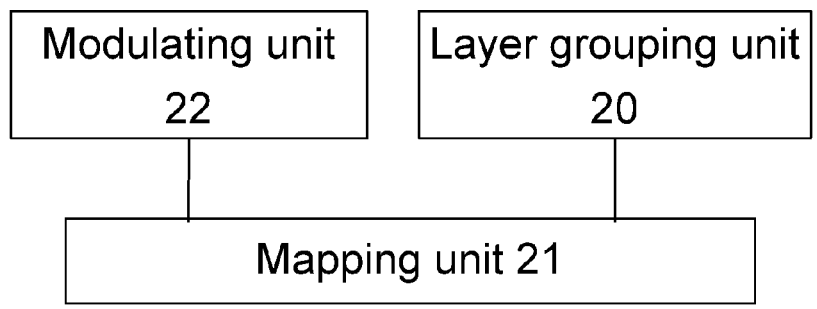
FIG. 2 is a schematic diagram of the structures of a device for mapping a codeword to a layer in a multi-input multi-output system according to an embodiment of the present invention.

FIG. 2 is a schematic diagram of the structures of a device for mapping a codeword to a layer in a multi-input multi-output system according to an embodiment of the present invention, as shown in FIG. 2, the device for mapping a codeword to a layer in a multi-input multi-output system in the embodiment comprises a layer grouping unit 20, a mapping unit 21, and a modulating unit 22; wherein the layer grouping unit 20 is used for grouping the current layers in a multi-input multi-output system according to the number of current codewords, the mapping unit 21 is used for mapping each codeword to a layer in a group to which the codeword corresponds, and the modulating unit 22 is used for modulating bits of a codeword into codeword symbols according to a preset encoding mode; when the mapping unit 21 maps a single codeword to two layers or to more than two layers, the mapping unit 21 further maps the codeword symbol in the single codeword to each layer in a polling manner; when the mapping unit 21 maps different numbers of codeword symbols to the layers, the mapping unit 21 further adds a null codeword symbol or more to the end of the codeword symbols on the layer to which less codeword symbols are mapped, so that the numbers of codeword symbols mapped to each layer are the same.

Those skilled in this art should understand that the device for mapping a codeword to a layer in a multi-input multi-output system in the embodiment is designed for implementing the method for mapping a codeword to a layer in a multi-input multi-output system, which is shown in FIG. 1, implementation function of each processing unit of the device illustrated in FIG. 2 can be understood by reference to the related description on the method shown in FIG. 1, so details are not repeated here. The function of each unit of the device for mapping a codeword to a layer in a multi-input multi-output system in the embodiment can be realized by running the program in a processor or via a specific logic circuit.

It is easy to implement the present invention, and the codeword-to-layer mapping is more reasonable.

The above mentioned are only preferred embodiments of the present invention, and are not to limit the protection scope of the present invention.

The invention claimed is:

1. A method for mapping a codeword to a layer in a multi-input multi-output system, comprising:
grouping current layers in a multi-input multi-output system according to a number of current codewords, and mapping each codeword to a layer in a group to which the codeword corresponds, wherein a number of the current layers in the multi-input multi-output system is 4 or more than 4; the number of layers supported by the multi-input multi-output system is 8 at most;

under the condition that the number of the current codewords is 2, when the number of the current layers in the multi-input multi-output system is 6, after the grouping, the numbers of layers in each group are 3, 3 respectively; when the number of the current layers in the multi-input multi-output system is 8, after the grouping, the numbers of layers in each group are 4, 4 respectively; when the number of the current layers in the multi-input multi-output system is 5, after the grouping, the numbers of layers in each group are 2, 3 respectively; and when the number of the current layers in the multi-input multi-output system is 7, after the grouping, the numbers of layers in each group are 3, 4 respectively.

2. The method according to claim 1, wherein under the condition that the number of the current codewords is 4, when the number of the current layers in the multi-input multi-output system is 4, after the grouping, the numbers of layers in each group are 1, 1, 1, 1 respectively; when the number of the current layers in the multi-input multi-output system is 5, after grouping, the numbers of layers in each group are 1, 1, 1, 2 respectively; when the number of the current layers in the multi-input multi-output system is 6, the numbers of layers in each group are 1, 1, 2, 2 respectively; when the number of the current layers in the multi-input multi-output system is 7, after the grouping, the numbers of layers in each group are 1, 2, 2, 2 respectively; and when the number of the current layers in the multi-input multi-output system is 8, after the grouping, the numbers of layers in each group are 2, 2, 2, 2 respectively;

bits of each codeword is modulated into codeword symbols according to a preset encoding mode, and the modulation symbols for a codeword are mapped to a layer in the group; and when each codeword is mapped to two layers or to more than two layers, the codeword symbols in each codeword is mapped to each layer in the group in a polling manner.

3. The method according to claim 1, wherein the codeword symbols are mapped to a layer in the group, specifically:

a mapping relationship of transmission diversity is as follows:

when the number of layers is 5: $x^{(0)}(i) = d^{(0)}(5i)$, $x^{(1)}(i) = d^{(0)}(5i+1)$, $$x^{(2)}(i) = d^{(0)}(5i+2), x^{(3)}(i) = d^{(0)}(5i+3), x^{(4)}(i) = d^{(0)}(5i+4);$$

when the number of layers is 6: $x^{(0)}(i) = d^{(0)}(6i)$, $$x^{(1)}(i) = d^{(0)}(6i+1), x^{(2)}(i) = d^{(0)}(6i+2), x^{(3)}(i) = d^{(0)}(6i+3),$$

$$x^{(4)}(i) = d^{(0)}(6i+4), x^{(5)}(i) = d^{(0)}(6i+5);$$

when the number of layers is 7: $x^{(0)}(i) = d^{(0)}(7i)$, $$x^{(1)}(i) = d^{(0)}(7i+1), x^{(2)}(i) = d^{(0)}(7i+2), x^{(3)}(i) = d^{(0)}(7i+3),$$

$$x^{(4)}(i) = d^{(0)}(7i+4), x^{(5)}(i) = d^{(0)}(7i+5), x^{(6)}(i) = d^{(0)}(7i+6);$$

when the number of layers is 8: $x^{(0)}(i) = d^{(0)}(8i)$, $x^{(1)}(i) = d^{(0)}(8i+1)$, $$x^{(2)}(i) = d^{(0)}(8i+2), x^{(3)}(i) = d^{(0)}(8i+3), x^{(4)}(i) = d^{(0)}(8i+4),$$

$$x^{(5)}(i) = d^{(0)}(8i+5), x^{(6)}(i) = d^{(0)}(8i+6), x^{(7)}(i) = d^{(0)}(8i+7);$$

wherein the modulation symbols for a codeword q are $d^{(q)}(0), \ldots, d^{(q)}(M_{symb}^{(q)}-1)$, $M_{symb}^{(q)}$ represents the number of the modulation symbols for the codeword q; the symbols mapped to a layer v are $x^{(v)}(0), \ldots, x^{(v)}(0), \ldots, x^{(v)}(M_{symb}^{layer}-1)$, $M_{symb}^{layer}$ represents the number of the modulation symbols per layer.

4. The method according to claim 1, wherein the codeword symbols are mapped to a layer in the group, specifically:

under the condition that the number of codewords is 2:

when the number of layers is 5: $\begin{aligned} x^{(0)}(i) &= d^{(0)}(2i) \\ x^{(1)}(i) &= d^{(0)}(2i+1) \end{aligned}$, $\begin{aligned} x^{(2)}(i) &= d^{(1)}(3i) \\ x^{(3)}(i) &= d^{(1)}(3i+1) \\ x^{(4)}(i) &= d^{(1)}(3i+2) \end{aligned}$;

when the number of layers is 6: $\begin{aligned} x^{(0)}(i) &= d^{(0)}(3i) \\ x^{(1)}(i) &= d^{(0)}(3i+1), \\ x^{(2)}(i) &= d^{(0)}(3i+2) \end{aligned}$ $\begin{aligned} x^{(3)}(i) &= d^{(1)}(3i) \\ x^{(4)}(i) &= d^{(1)}(3i+1) \\ x^{(5)}(i) &= d^{(1)}(3i+2) \end{aligned}$;

when the number of layers is 7: $\begin{aligned} x^{(0)}(i) &= d^{(0)}(3i) \\ x^{(1)}(i) &= d^{(0)}(3i+1), \\ x^{(2)}(i) &= d^{(0)}(3i+2) \end{aligned}$ $\begin{aligned} x^{(3)}(i) &= d^{(1)}(4i) \\ x^{(4)}(i) &= d^{(1)}(4i+1) \\ x^{(5)}(i) &= d^{(1)}(4i+2) \\ x^{(6)}(i) &= d^{(1)}(4i+3) \end{aligned}$;

when the number is layers is 8: $\begin{aligned} x^{(0)}(i) &= d^{(0)}(4i) & x^{(4)}(i) &= d^{(1)}(4i) \\ x^{(1)}(i) &= d^{(0)}(4i+1) & x^{(5)}(i) &= d^{(1)}(4i+1) \\ x^{(2)}(i) &= d^{(0)}(4i+2), & x^{(6)}(i) &= d^{(1)}(4i+2) \\ x^{(3)}(i) &= d^{(0)}(4i+3) & x^{(7)}(i) &= d^{(1)}(4i+3) \end{aligned}$;

wherein the modulation symbols for a codeword q are $d^{(q)}(0), \ldots, d^{(q)}(0)(M_{symb}^{(q)}-1)$, $M_{symb}^{(q)}$ represents the number of the modulation symbols for the codeword q; the symbols mapped to a layer v are $x^{(v)}, \ldots, x^{(v)}(M_{symb}^{layer}-1)$, $M_{symb}^{layer}$ represents the number of the modulation symbols per layer.

5. The method according to claim 4, wherein when the numbers of the codeword symbols mapped to each layer are different, a null codeword symbol or more are added to the end of the codeword symbols, so that the numbers of codeword symbols mapped to each layer are the same.

6. The method according to claim 1, wherein the codeword symbols are mapped to a layer in the group, specifically:

under the condition that the number of codewords is 4:

when the number of layers is 4:

$x^{(0)}(i) = d^{(0)}(i), x^{(1)}(i) = d^{(1)}(i), x^{(2)}(i) = d^{(2)}(i), x^{(3)}(i) = d^{(3)}(i)$;

when the number of layers is 5:

$x^{(0)}(i) = d^{(0)}(i), x^{(1)}(i) = d^{(1)}(i), x^{(2)}(i) = d^{(2)}(i), \begin{aligned} x^{(3)}(i) &= d^{(3)}(2i) \\ x^{(4)}(i) &= d^{(3)}(2i+1) \end{aligned}$;

when the number of layers is 6:

$x^{(0)}(i) = d^{(0)}(i), x^{(1)}(i) = d^{(1)}(i),$ $\begin{aligned} x^{(3)}(i) &= d^{(3)}(2i) & x^{(2)}(i) &= d^{(2)}(2i) & x^{(4)}(i) &= d^{(3)}(2i) \\ x^{(4)}(i) &= d^{(3)}(2i+1) & x^{(3)}(i) &= d^{(2)}(2i+1) & x^{(5)}(i) &= d^{(3)}(2i+1) \end{aligned}$;

when the number of layers is 7:

$x^{(0)}(i) = d^{(0)}(i), \begin{aligned} x^{(1)}(i) &= d^{(1)}(2i) \\ x^{(2)}(i) &= d^{(1)}(2i+1) \end{aligned}$, $\begin{aligned} x^{(3)}(i) &= d^{(2)}(2i) & x^{(5)}(i) &= d^{(3)}(2i) \\ x^{(4)}(i) &= d^{(2)}(2i+1) & x^{(6)}(i) &= d^{(3)}(2i+1) \end{aligned}$;

when the number of layers is 8: $\begin{aligned} x^{(0)}(i) &= d^{(0)}(2i) \\ x^{(1)}(i) &= d^{(0)}(2i+1) \end{aligned}$, $\begin{aligned} x^{(2)}(i) &= d^{(1)}(2i) & x^{(4)}(i) &= d^{(2)}(2i) & x^{(6)}(i) &= d^{(3)}(2i) \\ x^{(3)}(i) &= d^{(1)}(2i+1) & x^{(5)}(i) &= d^{(2)}(2i+1) & x^{(7)}(i) &= d^{(3)}(2i+1) \end{aligned}$;

wherein the modulation symbols for a codeword q are $d^{(q)}(0), \ldots, d^{(q)}(M_{symb}^{(q)}-1)$, $M_{symb}^{(q)}$ represents the number of the modulation symbols for the codeword q; the symbols mapped to a layer v are $x^{(v)}(0), \ldots, x^{(v)}(M_{symb}^{layer}-1)$, $M_{symb}^{layer}$ represents the number of the modulation symbols per layer.

7. The method according to claim 6, wherein when the numbers of the codeword symbols mapped to each layer are different, a null codeword symbol or more are added to the end of the codeword symbols, so that the numbers of codeword symbols mapped to each layer are the same.

8. A device for mapping a codeword to a layer in a multi-input multi-output system, comprising a layer grouping unit and a mapping unit;

wherein the layer grouping unit is used for grouping current layers in a multi-input multi-output system according to a number of current codewords;

the mapping unit is used for mapping each codeword to a layer in a group to which the codeword corresponds;

wherein a number of the current layers in the multi-input multi-output system is 4 or more than 4; the number of layers supported by the multi-input multi-output system is 8 at most;

under the condition that the number of the current codewords is 2, when the number of the current layers in the multi-input multi-output system is 6, after the layer grouping unit completes the grouping, the numbers of layers in each group are 3, 3 respectively; when the number of the current layers in the multi-input multi-output system is 8, after the layer grouping unit completes the grouping, the numbers of layers in each group are 4, 4 respectively; when the number of the current layers in the multi-input multi-output system is 5, after the layer grouping unit completes the grouping, the numbers of layers in each group are 2, 3 respectively; and when the number of the current layers in the multi-input multi-output system is 7, after the layer grouping unit completes the grouping, the numbers of layers in each group are 3, 4 respectively;

the device further comprising: a modulating unit for modulating bits of each codeword into codeword symbols according to a preset encoding mode; and the mapping unit is further used for mapping modulation symbols for a single codeword to a layer in the group to which the codeword corresponds, and when modulation symbols for the single codeword is mapped to two layers or to more than two layers, the mapping unit is further used for mapping the codeword symbol in the single codeword to each layer in a polling manner.

9. The device according to claim 8, wherein
under the condition that the number of codewords is 2:

when the number of layers is 5: $\begin{array}{l} x^{(0)}(i) = d^{(0)}(2i) \\ x^{(1)}(i) = d^{(0)}(2i+1) \end{array}$, $\begin{array}{l} x^{(2)}(i) = d^{(1)}(3i) \\ x^{(3)}(i) = d^{(1)}(3i+1) \\ x^{(4)}(i) = d^{(1)}(3i+2) \end{array}$;

when the number of layers is 6: $\begin{array}{l} x^{(0)}(i) = d^{(0)}(3i) \\ x^{(1)}(i) = d^{(0)}(3i+1), \\ x^{(2)}(i) = d^{(0)}(3i+2) \end{array}$ $\begin{array}{l} x^{(3)}(i) = d^{(1)}(3i) \\ x^{(4)}(i) = d^{(1)}(3i+1) \\ x^{(5)}(i) = d^{(1)}(3i+2) \end{array}$;

when the number of layers is 7: $\begin{array}{l} x^{(0)}(i) = d^{(0)}(3i) \\ x^{(1)}(i) = d^{(0)}(3i+1), \\ x^{(2)}(i) = d^{(0)}(3i+2) \end{array}$ $\begin{array}{l} x^{(3)}(i) = d^{(1)}(4i) \\ x^{(4)}(i) = d^{(1)}(4i+1) \\ x^{(5)}(i) = d^{(1)}(4i+2) \\ x^{(6)}(i) = d^{(1)}(4i+3) \end{array}$;

when the number of layers is 8: $\begin{array}{l} x^{(0)}(i) = d^{(0)}(4i) \\ x^{(1)}(i) = d^{(0)}(4i+1) \\ x^{(2)}(i) = d^{(0)}(4i+2) \\ x^{(3)}(i) = d^{(0)}(4i+3) \end{array}$, $\begin{array}{l} x^{(4)}(i) = d^{(1)}(4i) \\ x^{(5)}(i) = d^{(1)}(4i+1) \\ x^{(6)}(i) = d^{(1)}(4i+2) \\ x^{(7)}(i) = d^{(1)}(4i+3) \end{array}$;

wherein the modulation symbols for a codeword q are $d^{(q)}(0), \ldots, d^{(q)}(M_{symb}^{(q)}-1)$, $M_{symb}^{(q)}$ represents the number of the modulation symbols for the codeword q; the symbols mapped to a layer v are $x^{(v)}(0), \ldots, x^{(v)}(M_{symb}^{layer}-1)$, $M_{symb}^{layer}$ represents the number of the modulation symbols per layer.

10. The device according to claim 8, wherein
under the condition that the number of the current codewords is 4, when the number of the current layers in the multi-input multi-output system is 4, after the layer grouping unit completes the grouping, the numbers of layers in each group are 1, 1, 1, 1 respectively; when the number of the current layers in the multi-input multi-output system is 5, after the layer grouping unit completes the grouping, the numbers of layers in each group are 1, 1, 1, 2 respectively; when the number of the current layers in the multi-input multi-output system is 6, after the layer grouping unit completes the grouping, the numbers of layers in each group are 1, 1, 2, 2 respectively; when the number of the current layers in the multi-input multi-output system is 7, after the layer grouping unit completes the grouping, the numbers of layers in each group are 1, 2, 2, 2 respectively; and when the number of the current layers in the multi-input multi-output system is 8, after the layer grouping unit completes the grouping, the numbers of layers in each group are 2, 2, 2, 2 respectively;

under the condition that the number of codewords is 4:

when the number of layers is 4:

$x^{(0)}(i) = d^{(0)}(i), \; x^{(1)}(i) = d^{(1)}(i), x^{(2)}(i) = d^{(2)}(i), x^{(3)}(i) = d^{(3)}(i)$;

when the number of layers is 5:

$x^{(0)}(i) = d^{(0)}(i), \; x^{(1)}(i) = d^{(1)}(i), x^{(2)}(i) = d^{(2)}(i), \begin{array}{l} x^{(3)}(i) = d^{(3)}(2i) \\ x^{(4)}(i) = d^{(3)}(2i+1) \end{array}$;

when the number of layers is 6:

$x^{(0)}(i) = d^{(0)}(i), \; x^{(1)}(i) = d^{(1)}(i),$ $\begin{array}{l} x^{(2)}(i) = d^{(2)}(2i) \\ x^{(3)}(i) = d^{(2)}(2i+1) \end{array}, \begin{array}{l} x^{(4)}(i) = d^{(3)}(2i) \\ x^{(5)}(i) = d^{(3)}(2i+1) \end{array}$;

when the number of layers is 7:

$x^{(0)}(i) = d^{(0)}(i), \begin{array}{l} x^{(1)}(i) = d^{(1)}(2i) \\ x^{(2)}(i) = d^{(1)}(2i+1) \end{array},$ $\begin{array}{l} x^{(3)}(i) = d^{(2)}(2i) \\ x^{(4)}(i) = d^{(2)}(2i+1) \end{array}, \begin{array}{l} x^{(5)}(i) = d^{(3)}(2i) \\ x^{(6)}(i) = d^{(3)}(2i+1) \end{array}$;

when the number of layers is 8:

$\begin{array}{l} x^{(0)}(i) = d^{(0)}(2i) \\ x^{(1)}(i) = d^{(0)}(2i+1) \end{array}, \begin{array}{l} x^{(2)}(i) = d^{(1)}(2i) \\ x^{(3)}(i) = d^{(1)}(2i+1) \end{array},$ $\begin{array}{l} x^{(4)}(i) = d^{(2)}(2i) \\ x^{(5)}(i) = d^{(2)}(2i+1) \end{array}, \begin{array}{l} x^{(6)}(i) = d^{(3)}(2i) \\ x^{(7)}(i) = d^{(3)}(2i+1) \end{array}$;

wherein the modulation symbols for a codeword q may $d^{(q)}(0), \ldots, d^{(q)}(M_{symb}^{(q)}-1)$, $M_{symb}^{(q)}$ may represent the number of the modulation symbols for the codeword q, the symbols mapped to a layer v may be $x^{(v)}(0), \ldots, x^{(v)}(M_{symb}^{layer}-1)$, $M_{symb}^{layer}$ may represent the number of the modulation symbols per layer; and when the numbers of the codeword symbols mapped to each layer are different, a null codeword symbol or more is added to the end of the codeword symbols, so that the numbers of codeword symbols mapped to each layer are the same.

11. The device according to claim 8, wherein the mapping unit is further used for mapping the codeword symbols to a layer in the group to which the codeword) symbol corresponds, specifically:

a mapping relationship of transmission diversity being as follows:

when the number of layers is 5: $x^{(0)}(i) = d^{(0)}(5i)$, $x^{(1)}(i) = d^{(0)}(5i+1)$, $x^{(2)}(i) = d^{(0)}(5i+2)$, $x^{(3)}(i) = d^{(0)}(5i+3)$, $x^{(4)}(i) = d^{(0)}(5i+4)$;

when the number of layers is 6: $x^{(0)}(i) = d^{(0)}(6i)$, $x^{(1)}(i) = d^{(0)}(6i+1)$, $x^{(2)}(i) = d^{(0)}(6i+2)$, $x^{(3)}(i) = d^{(0)}(6i+3)$, $x^{(4)}(i) = d^{(0)}(6i+4)$, $x^{(5)}(i) = d^{(0)}(6i+5)$;

when the number of layers is 7: $x^{(0)}(i) = d^{(0)}(7i)$, $x^{(1)}(i) = d^{(0)}(7i+1)$, $x^{(2)}(i) = d^{(0)}(7i+2)$, $x^{(3)}(i) = d^{(0)}(7i+3)$, $x^{(4)}(i) = d^{(0)}(7i+4)$, $x^{(5)}(i) = d^{(0)}(7i+5)$, $x^{(6)}(i) = d^{(0)}(7i+6)$;

when the number of layers is 8: $x^{(0)}(i) = d^{(0)}(8i)$, $x^{(1)}(i) = d^{(0)}(8i+1)$, $x^{(2)}(i) = d^{(0)}(8i+2)$, $x^{(3)}(i) = d^{(0)}(8i+3)$, $x^{(4)}(i) = d^{(0)}(8i+4)$, $x^{(5)}(i) = d^{(0)}(8i+5)$, $x^{(6)}(i) = d^{(0)}(8i+6)$, $x^{(7)}(i) = d^{(0)}(8i+7)$.

\* \* \* \* \*